No. 844,012. PATENTED FEB. 12, 1907.
J. J. FRIC.
OPTICAL INSTRUMENT.
APPLICATION FILED JUNE 23, 1906.
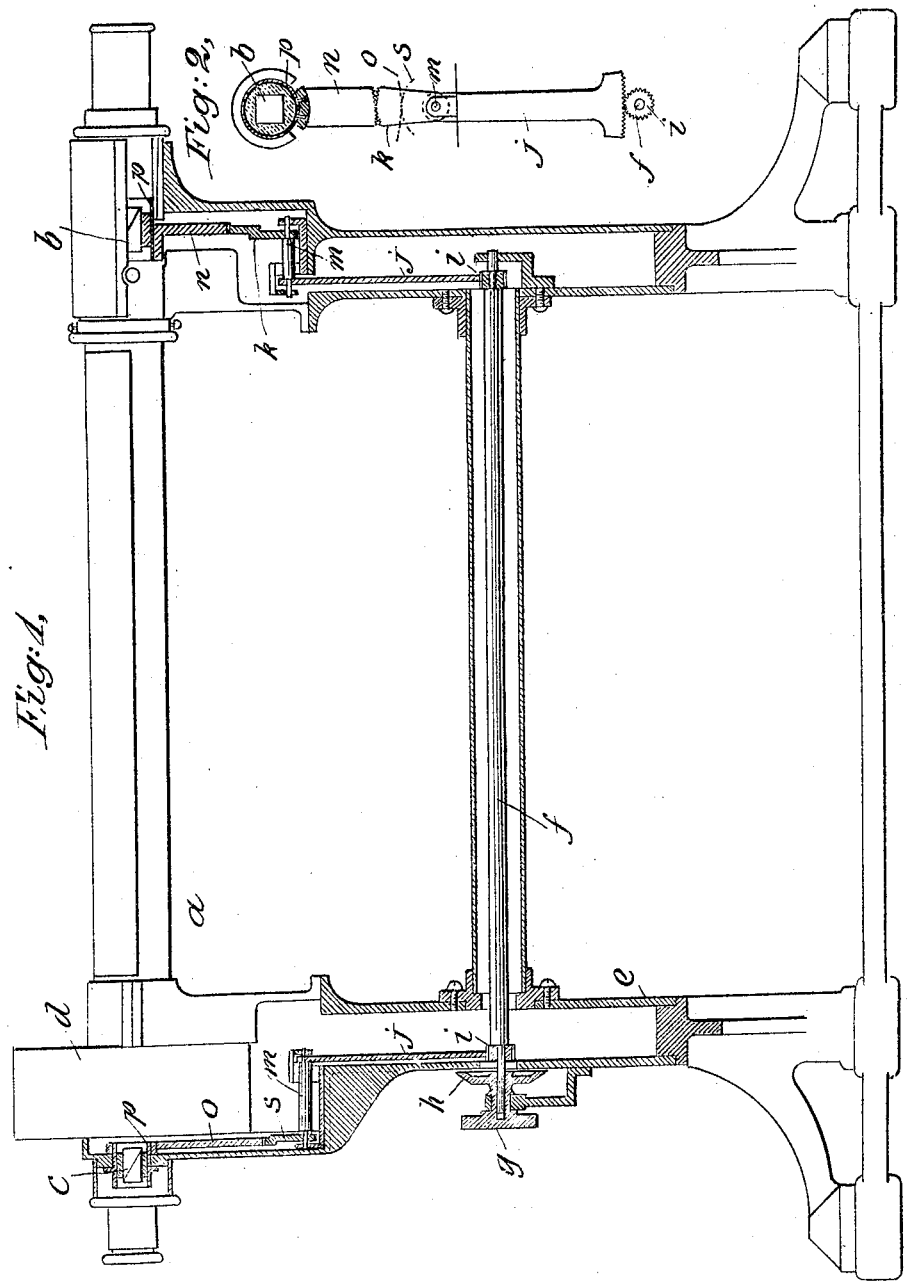

UNITED STATES PATENT OFFICE.

JOSEF JAN FRIČ, OF PRAGUE, AUSTRIA-HUNGARY.

OPTICAL INSTRUMENT.

No. 844,012. Specification of Letters Patent. Patented Feb. 12, 1907.

Application filed June 23, 1906. Serial No. 323,025.

*To all whom it may concern:*

Be it known that I, JOSEF JAN FRIČ, a subject of the Emperor of Austria, and residing at Prague, Bohemia, Austria, have invented certain new and useful Improvements in Optical Instruments, of which the following is a specification, such as will enable those skilled in the art to which it appertains to make and use the same.

This invention relates to optical instruments, and particularly to that class of scientific measuring and observation devices known as "quartz-wedge" polariscopes; and the object of the invention is to provide a polariscope of this class with an adjustable device whereby the hereinbefore unchangeable brightness and sensitiveness of the quartz-wedge polariscope can be increased and diminished and adjusted to suit the requirements of the solution or of the object to be analyzed; and I attain this object by the interposition of rotatable mechanism, whereby the polarizing-prism can be oscillated at an angle different to the analyzing-prism.

The invention is fully disclosed in the following specification, of which the accompanying drawings, illustrating a preferable mode of mechanical execution, forms a part, in which the separate parts of my improvement are designated by suitable reference characters in each of the views, and in which—

Figure 1 is a vertical longitudinal side view of a quartz-wedge polariscope, shown partly in section, illustrating my device; and Fig. 2 is a front view of my device, shown partly in section.

The advantages of the usual circular polariscopes for general use and adapted for monochromatic light and fitted with Laurent's or Lippich's polarizing system consist in the possibility of a slight rotation of their polarizing-prisms for an adjustment of the brightness and sensitiveness of the instrument as far as the solution or the object which is examined may admit. Such adjusted position in the polarizing-prism requires a certain corresponding position of the analyzing-prism, which can be adjusted thereto accordingly. Quartz-wedge polariscopes, on account of their construction, do not allow such an adjustment, as it would be necessary after each change of position of the polarizing-prism to remove the quartz-wedges in order to make possible the adjustment of the analyzing-prism. For this reason quartz-wedge polariscopes have as yet been constructed only for a certain unchangeable brightness and sensitiveness. A great advantage of this instrument consists in the possibility of employing intense white light; but it does not possess the advantage of adjustable sensitiveness, which latter defect my improvement completely rectifies.

The system underlying my improvement rests upon the fact that the rotation of the analyzing-prism must imply a rotation over an angle exactly one-half that of the polarizing-prism, and the device specifically described below and illustrated in the accompanying drawings consists in the mechanical arrangement of turning the analyzing-prism over a certain angle, whereby also mechanically the polarizing-prism is moved simultaneously over an angle of twice the degree of the former, it also being possible to attain the same effect by separate movements.

The prisms once adjusted may always be kept in a correct reciprocal position, and for this reason the quartz-wedge polariscope in my improved form will always be ready for work, there being obviated the necessity to remove the wedges from the path of the rays of light for the purpose of adjustment.

In the accompanying drawings, $a$ is the polariscope.

$b$ is the polarizing-prism.

$c$ is the analizing-prism, and $d$ is the closed analyzer.

The stand $e$ of the polariscope is provided centrally witth a longitudinally - ranging shaft $f$, which can be rotated by the thumb-screw $g$, the latter having a circular scale. The outer ends of the shaft $f$ run in bearings, and these ends are each provided with pinions $i$, which rotate with the shaft $f$. As the requirement of this class of apparatus limits the rotation of the prisms to a range not exceeding ten degrees, the pinions $i$ are of small diameter. Gearing into the pinions are downwardly-directed segmental gears $j$, each one having its own pivotal bearing on the frame of the apparatus, and each gear $j$ has an upwardly - directed arm $k$ and $s$, which arms are fastened to the pivot-shaft $m\ m$ and swing in a reverse direction to their lower segmental gear $j$. Engaging with the teeth of the upper segmental arms $k$ and $s$ are segmental gearing provided on lever-arms $n$ and $o$, which latter have as their pivotal bearings the inclosing circular framework $p$ of the polarizing-prism $b$ and of the analyzing-prism $c$.

The construction, position, and operation of the various gearings $j, k, s, n$, and $o$ is identical, except that the radii of the engaging gears $k$ and $n$ for the polarizing-prism is proportioned to the radii of the engaging gears $s$ and $o$ in such a manner that the transmission of rotation is effected at the rate of one to one at the analyzer and at one to two at the polarizer, or the reciprocal length of the geared lever-arm $o$ is to the length of the geared lever-arm $n$ proportioned in such a manner that the geared lever-arms $s$ and $k$ will transmit to the former and the therewith-connected prisms $c$ and $b$ a rotary motion, which will enable the analyzing-prism $c$ to traverse an angle of but one-half of that of the polarizing-prism by any rotative movement applied to the shaft $f$ by means of the thumb-screw $g$. If the movements of the prisms are required to be effected separately, each of the prisms can be connected to its own thumb-screw, (eventually tangent-screw,) the latter being provided with special circular scales.

It will thus be seen that by means of my improved quartz-wedge polariscope the sensitiveness of the apparatus can be minutely adjusted in accordance with the requirement of the solution or object under observation and that the mechanism is both easy of operation and positive in action.

I do not confine myself to the particular arrangement of pinions and pivoted lever-arms as shown and described, but similar other mechanical devices whereby rotative movement can be given to the quartz-wedge prisms produced at the ratio of angular deviation of one to two between the analyzing and polarizing prisms can be adapted in order to obtain this result without departing from the spirit of my invention or sacrificing its advantages.

Having fully described my invention, what I claim as new, and desire to secure by Letters Patent, is—

1. A quartz-wedge polariscope having an analyzing-prism and a polarizing-prism suitably mounted in order to illuminate the subject-matter of analyzation provided with means to rotate the polarizing and the analyzing prisms upon their axis, one of such prisms adapted to describe thereby an angular travel equal to one-half of the other prism.

2. A quartz-wedge polariscope having an analyzing and a polarizing prism provided with means of rotating both prisms simultaneously in a manner securing by such rotary movement a rotation of the analyzing-prism over half the angle of the simultaneously-rotating polarizing-prism.

3. In a quartz-wedge polariscope having an analyzer and an analyzing-prism and a polarizing-prism, both prisms suitably mounted and adapted to rotate in a common axis, geared lever-arms which are pivotally rotating around the axis of the prisms and adapted to rotate the prisms, such geared lever-arms being of predetermined radial lengths and operated by means of engaging gears of predetermined length with the object of rotating one of the prisms over double the angular distance to that of the other prism, and means for simultaneously operating each of said gears from a common point of application.

In testimony that I claim the foregoing as my invention I have signed my name, in presence of two witnesses, this 7th day of June, 1906.

JOSEF JAN FRIČ.

Witnesses:
THEODORE J. HÁCHA,
ADOLPH FISCHER.